US012032373B2

(12) United States Patent
Eldred et al.

(10) Patent No.: US 12,032,373 B2
(45) Date of Patent: Jul. 9, 2024

(54) SPHERICAL AUTONOMOUS UNDERWATER VEHICLE

(71) Applicant: The United States of America, as represented by the Secretary of the Navy, Arlington, VA (US)

(72) Inventors: Ross Anthony Eldred, Pacific Grove, CA (US); Jonathan Lussier, Broomfield, CO (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 585 days.

(21) Appl. No.: 17/027,682

(22) Filed: Sep. 21, 2020

(65) Prior Publication Data
US 2021/0089031 A1 Mar. 25, 2021

Related U.S. Application Data

(60) Provisional application No. 62/903,534, filed on Sep. 20, 2019.

(51) Int. Cl.
*G05D 1/00* (2024.01)
*B63B 79/15* (2020.01)
(Continued)

(52) U.S. Cl.
CPC ........... *G05D 1/0088* (2013.01); *B63B 79/15* (2020.01); *B63B 79/40* (2020.01); *B63G 8/001* (2013.01);
(Continued)

(58) Field of Classification Search
CPC ...... G05D 1/0088; G05D 1/048; B63B 79/15; B63B 79/40; B63B 3/13; B63G 8/001;
(Continued)

(56) References Cited

U.S. PATENT DOCUMENTS 2,491,094 A * 12/1949 Du Frane ................. B60Q 7/00
4,455,962 A * 6/1984 Gongwer ................. B63B 3/13
(Continued)

FOREIGN PATENT DOCUMENTS

KR 101642494 B1 * 7/2016 ............... B63G 8/39

OTHER PUBLICATIONS

2G Robotics. 2015a. "Sonar vs. Laser." Accessed Dec. 11 http://www.2grobotics.com/sonarvslaser.pdf.
(Continued)

*Primary Examiner* — Elaine Gort
*Assistant Examiner* — Ellis B. Ramirez
(74) *Attorney, Agent, or Firm* — Naval Postgraduate School; Scott Bell

(57) ABSTRACT

The invention relates to an autonomous underwater vehicle (AUV). The AUV includes a frame and tunnel thrusters for propelling and orientating the AUV, where the tunnel thrusters have inlets and outlets, each of outlets being directed in a different orientation, and are mounted to the frame. The AUV further includes fasteners for connecting the frame to a hull, where the fasteners have an orientation that is substantially parallel to the tunnel thrusters. The hull has a substantially spherical shape and further includes (1) a bottom plate with inlet openings, (2) a top plate with outlet openings, where the top plate and the bottom plate are affixed to the fasteners and hold plate rings of the hull in place, and (3) each of the plate rings that further includes a corresponding retention ring and corresponding central plates.

10 Claims, 11 Drawing Sheets

(51) Int. Cl.
  B63B 79/40   (2020.01)
  B63G 8/00   (2006.01)
  B63G 8/08   (2006.01)
(52) U.S. Cl.
  CPC .............. *B63G 8/08* (2013.01); *G05D 1/048* (2013.01); *B63G 2008/004* (2013.01)
(58) Field of Classification Search
  CPC .............. B63G 8/08; B63G 2008/004; G06K 19/07749
  USPC ........ 701/21, 472; 114/39.25, 271, 312, 324
  See application file for complete search history.

(56) References Cited

U.S. PATENT DOCUMENTS

| | | | | |
|---|---|---|---|---|
| 4,571,192 | A  * | 2/1986 | Gongwer | B63H 1/28 |
| 6,017,106 | A  * | 1/2000 | Adams | G06F 1/1616 |
| 2009/0031940 | A1* | 2/2009 | Stone | G01S 15/93 |
| 2016/0129979 | A1* | 5/2016 | Rossano | G21C 17/013 |
| 2016/0257386 | A1* | 9/2016 | Bhattacharyya | B63G 8/08 |
| 2017/0081004 | A1* | 3/2017 | Lichter | B63G 8/001 |
| 2017/0092005 | A1* | 3/2017 | Hasegawa | G06T 7/74 |
| 2019/0127034 | A1* | 5/2019 | Larson | G01S 17/08 |
| 2019/0279067 | A1* | 9/2019 | Kukulya | G01S 7/521 |
| 2020/0385093 | A1* | 12/2020 | Gordon, II | B63B 35/50 |

OTHER PUBLICATIONS

2G Robotics. 2015b. "ULS-100 Product." Accessed Dec. 11. http://www.2grobotics.com/products/underwater-laser-scanner-uls-100/.

Acott, Chris. (Jun. 1999). "A brief history of diving and decompression illness." SPUMS Journal 29: 98-109.

Allotta, Benedetto, Riccardo Costanzi, Alessandro Ridolfi, Carlo Colombo, Fabio Bellavia, Marco Fanfani, Fabio Pazzaglia et al. (Jun. 2015). "The ARROWS project: Adapting and Developing Robotics Technologies for Underwater Archaeology." IFAC-PapersOnLine 48, No. 2:194-199.

CalcTool. 2008. "Pressure at Depth." Accessed Oct. 14, 2015. http://www.calctool.org/CALC/other/games/depth_press.

Durrant-Whyte, Hugh, and Tim Bailey. (Jun. 2006). "Simultaneous Localization and Mapping: Part I." IEEE Robotics & Automation Magazine, 13, No. 2: 99- 110.

Fairfield, Nathaniel, George Kantor, and David Wettergreen. (May 2006). "Towards Particle Filter SLAM with Three Dimensional Evidence Grids in a Flooded Subterranean Environment." Robotics and Automation/.

Fairfield, Nathaniel, George Kantor, and David Wettergreen. (Feb. 2007). "Real-time SLAM with Octree Evidence Grids for Exploration in Underwater Tunnels." Journal of Field Robotics 24, No. 1: 3-22.

Hoibraten, Haugan, Thoresen. (Oct. 15, 2003). The Environmental Impact of the Sunken Submarine Komsomolets. FFI/Report-2003/02523. Kjeller, Norway: Norwegian Defense Research Establishment.

Montgomery, George. 1995. "The Komsomolets Disaster." Studies in Intelligence. 38, No. 5.https://www.cia.gov/library/center-for-the-study-of- intelligence/csi-publications/csi- studies/studies/95unclass/Montgomery.html.

Nuytco Research Ltd. 2015. "Products: Exosuit The Future of Ocean Exploration." Accessed Nov. 9. http://nuytco.com/products/exosu.

Sagalevitch, Anatoly M. (Nov. 1995). "Results of Five Years of Exploration with Deep Manned Submersibles 'MIR-1' and 'MIR-2' on Nuclear Submarine 'Komsomolets' Wreck." Oceans '95. Accessed Oct. 14, 2015. doi:10.1109/OCEANS.1995.526743.

Salumae, Taavi, Rasmus Raag, Jaan Rebane, Andres Ernits, Gert Toming, Mart Ratas, and Maarja Kruusmaa. (Sep. 2014). "Design Principle of a Biomimetic Underwater Robot U-CAT." Oceans-St. John's, pp. 1-5.

Stone Aerospace. 2010. "DEPTHX (DEep Phreatic THermal eXplorer)." Accessed Oct. 19, 2015. http://www.stoneaerospace.com/products-pages/products-DEPTHX.php.

The National Security Archive, The George Washington University. (Feb. 12, 2010). "Project Azorian: The CIA's Declassified History of the Glomar Explorer." Accessed Nov. 9, 2015. http://nsarchive.gwu.edu/nukevault/ebb305/.

The Wreck Site. 2015. "Komsomolets (K-278)[+1989]." Accessed Oct. 14. http://www.wrecksite.eu/wreck.aspx?115318.

Woods Hole Oceanographic Institute. (Sep. 2, 2010). "A Titanic Tales." Oceanus Magazine. Accessed Nov. 9, 2015. http://www.whoi.edu/oceanus/feature/a-titanic-tale.

Eldred, Ross A. (Dec. 2015). "Autonomous underwater vehicle architecture synthesis for shipwreck interior exploration". Calhoun: The NPS Institutional Archive. http://hdl.handle.net/10945/47940.

* cited by examiner

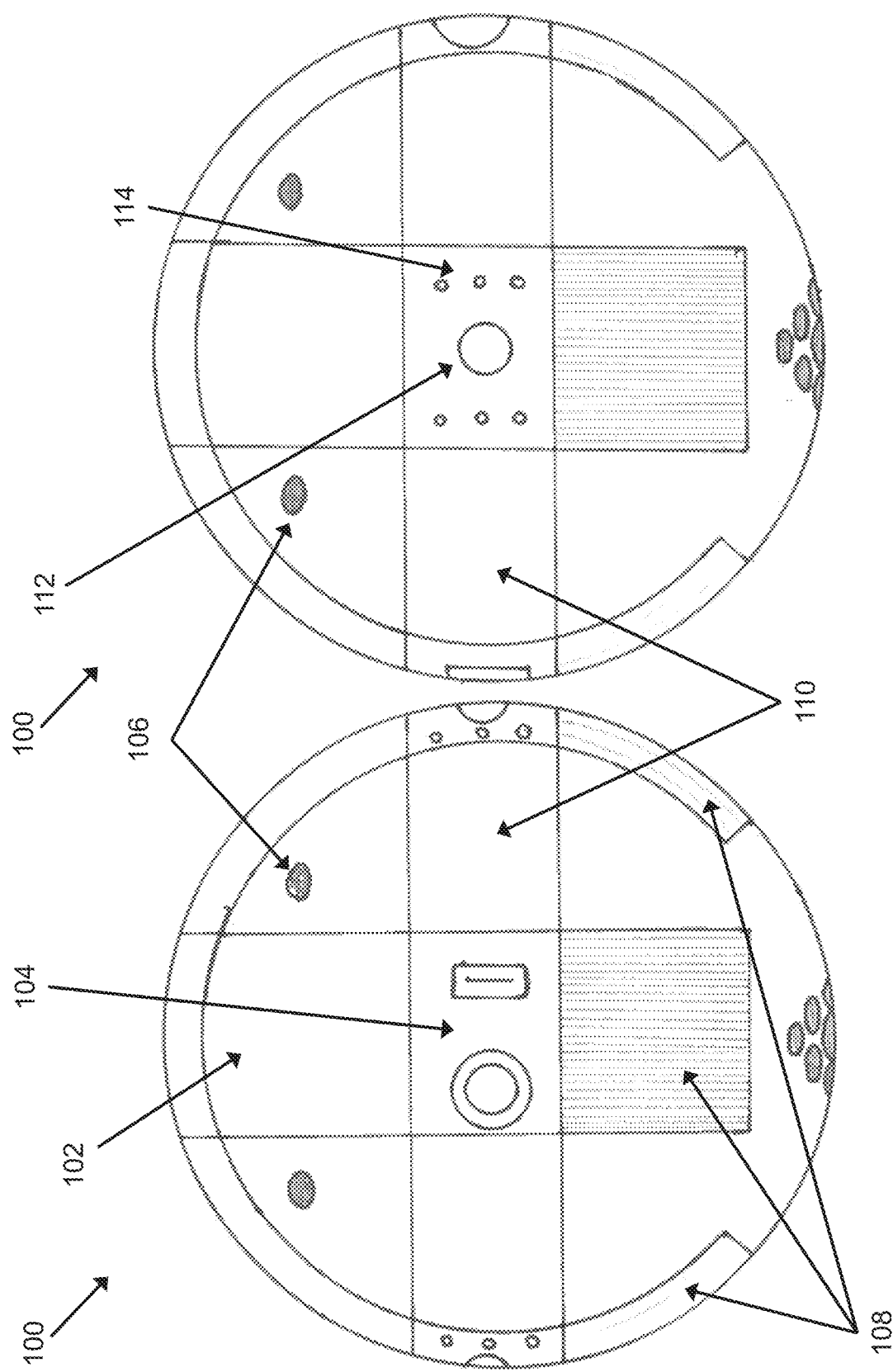

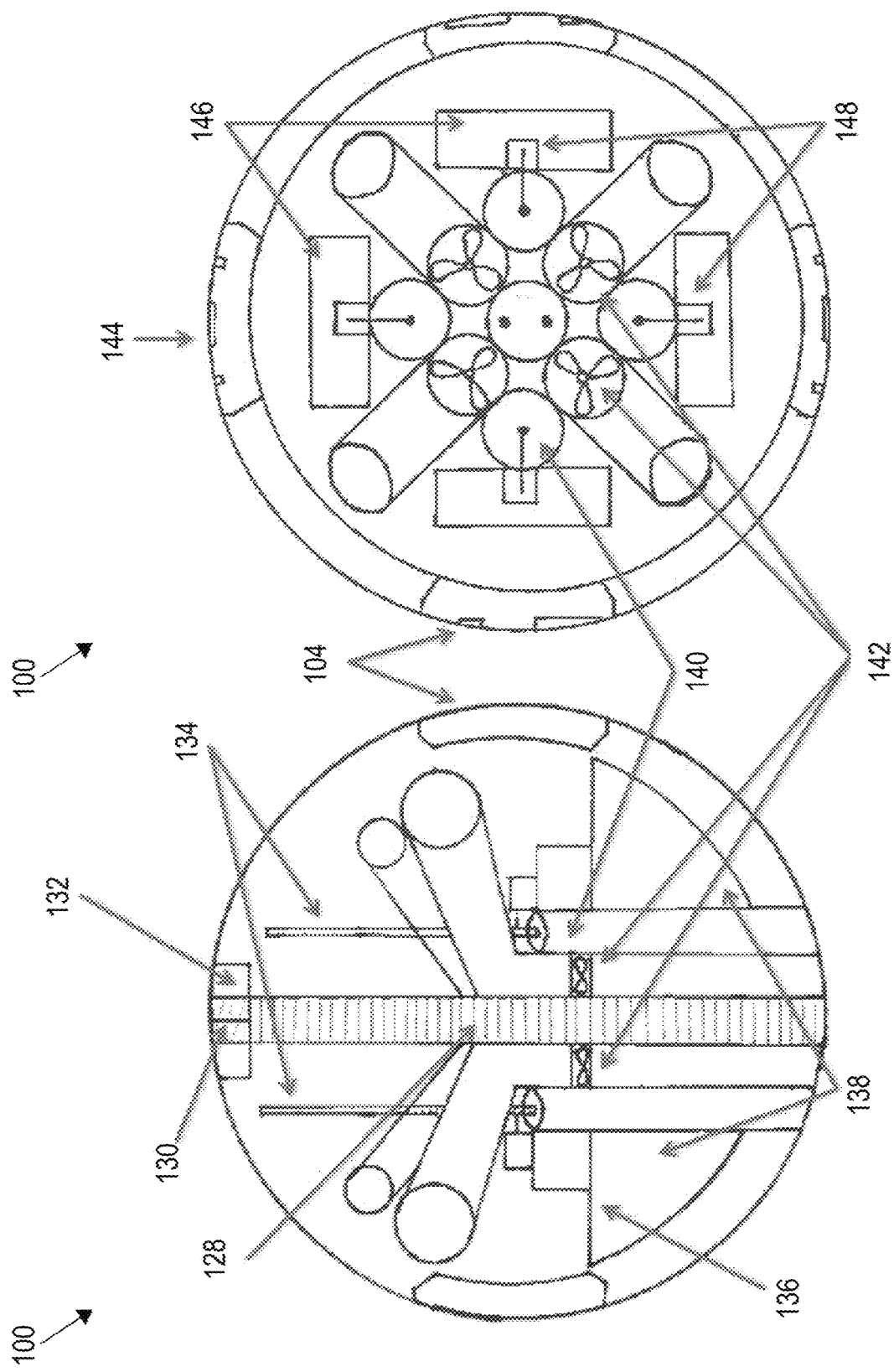

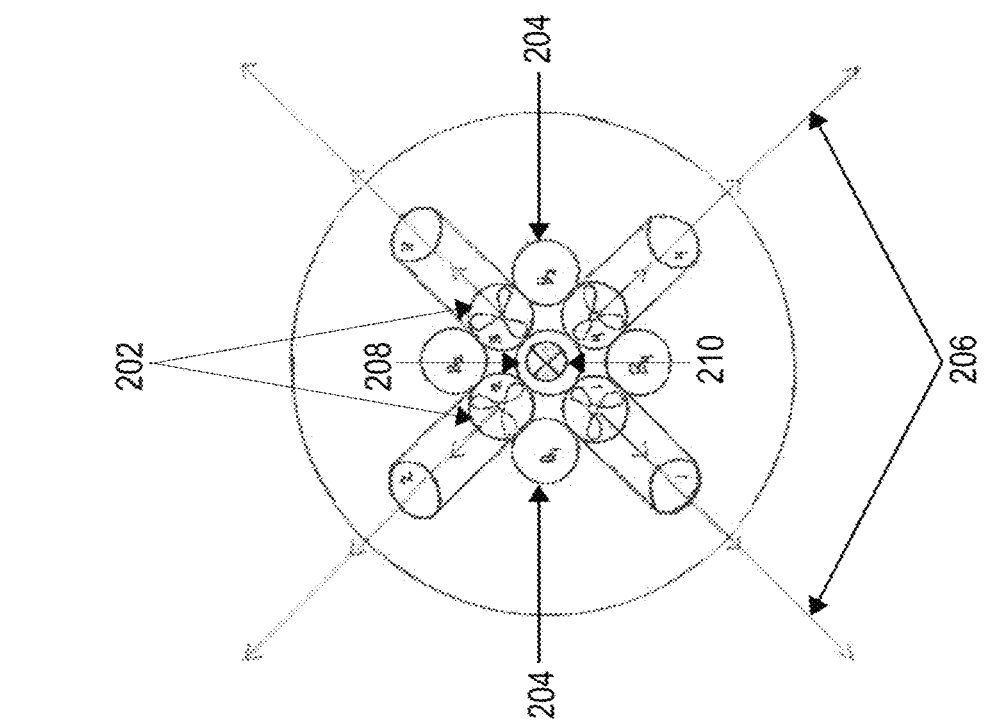
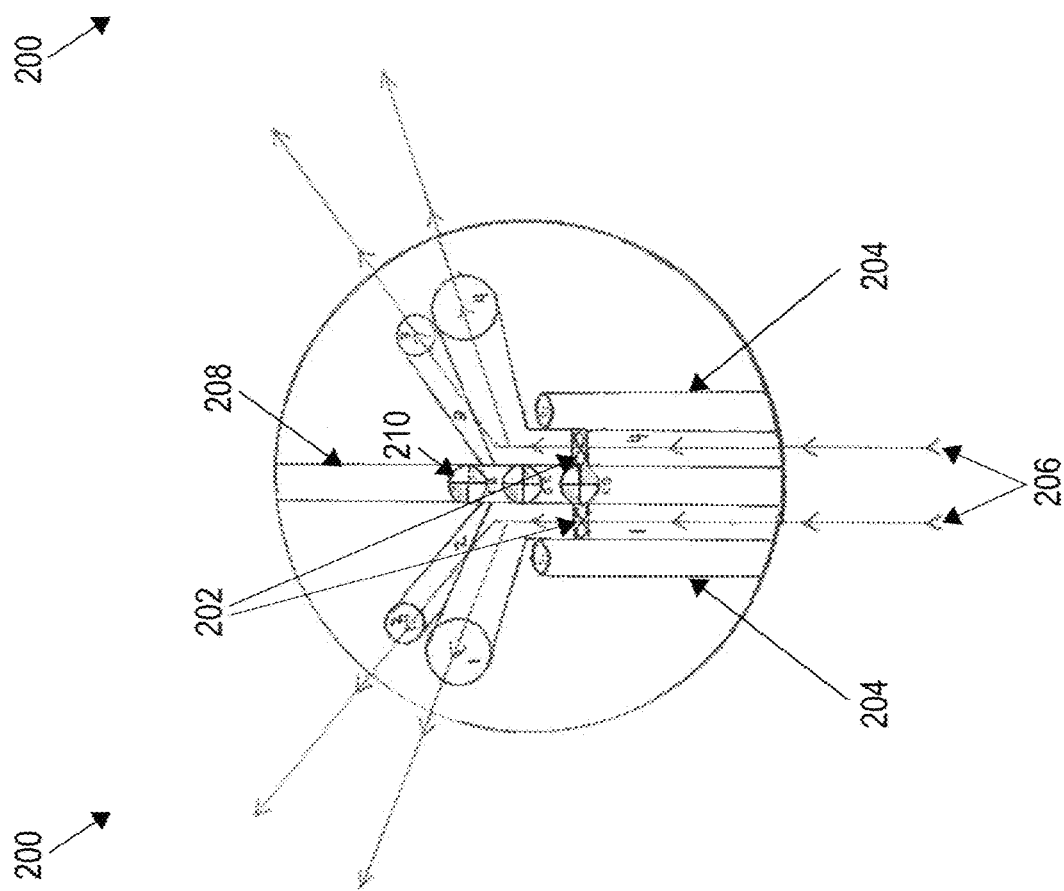
FIG. 2A
FIG. 2B

SPHERICAL AUTONOMOUS UNDERWATER VEHICLE

RELATION TO OTHER APPLICATIONS

This application claims priority to and the benefit of U.S. Application No. 62/903,534 filed Sep. 20, 2019, which is hereby incorporated in its entirety by reference.

FIELD OF THE INVENTION

The present invention is directed to an autonomous underwater vehicle (AUV) designed to operate in tight, entanglement-prone and limited-visibility environments.

BACKGROUND

Special risks and constraints plague the exploration of submerged, enclosed spaces like shipwrecks. Such challenges include tight maneuvering space, obstructions and entanglement hazards, as well as poor visibility caused by the disturbance of fine sediment. The value of successful exploration missions into shipwreck interiors (or other enclosed, submerged spaces) can be substantial, especially if the information gained is significant to intelligence collection efforts. The shipwreck-interior exploration mission is emphasized, despite the existence of many other enclosed, submerged spaces of interest, because such a hostile, extreme environment drives design requirements that result in a highly capable vehicle. An AUV suitable for such a mission may possess the attributes needed for the exploration of many other environments of interest.

DEPTHX, developed by Stone Aerospace Company, is a fully autonomous, mapping capable (via 3D SLAM), low snag, axisymmetric ellipsoid AUV. It is capable of dead reckoning and SLAM navigation, with four DOF (X, Y, Z, Yaw) control and a robust sensor suite (SONAR, video, sample collection). It does not enable shipwreck interior exploration because it is very large (2 m×1.5 m ellipsoid), very heavy (1.35 T), and has no silt-out reduction design characteristics.

The Hovering Autonomous Underwater Vehicle (HAUV) by Bluefin Robotics is a fully autonomous, mapping capable (via DIDSON imaging), AUV designed specifically for exterior ship hull inspections. It employs a hull-relative Doppler velocity log (DVL) navigation methodology that is launchable from confined spaces such as a small boat and can support real-time data transmission via a fiber optic tether. It does not enable shipwreck interior exploration because it requires a tether that would severely restrict maneuverability in the interior spaces.

The Centre for Automation and Robotics, in Madrid, Spain, has developed a small spherical AUV (UX-1) for submerged mine shaft exploration. This vehicle has 50 cm diameter and uses a cross "X" shaped tunnel thruster configuration. Its hull design consists of two hemispheres.

SUMMARY

Embodiments in accordance with the invention relate an autonomous underwater vehicle. The autonomous underwater vehicle includes a frame and tunnel thrusters for propelling and orientating the AUV, where the tunnel thrusters have inlets and outlets, each of outlets being directed in a different orientation, and are mounted to the frame. The AUV further includes fasteners for connecting the frame to a hull, where the fasteners have an orientation that is substantially parallel to the tunnel thrusters. The hull has a substantially spherical shape and further includes (1) a bottom plate with inlet openings, (2) a top plate with outlet openings, where the top plate and the bottom plate are affixed to the fasteners and hold plate rings of the hull in place, and (3) each of the plate rings that further includes a corresponding retention ring and corresponding central plates.

BRIEF DESCRIPTION OF THE DRAWINGS

FIGS. 1A-1H shows an example spherical autonomous underwater vehicle (AUV).
FIGS. 2A and 2B show water flow through tunnel thrusters of an example AUV 200.

Figure 1D:
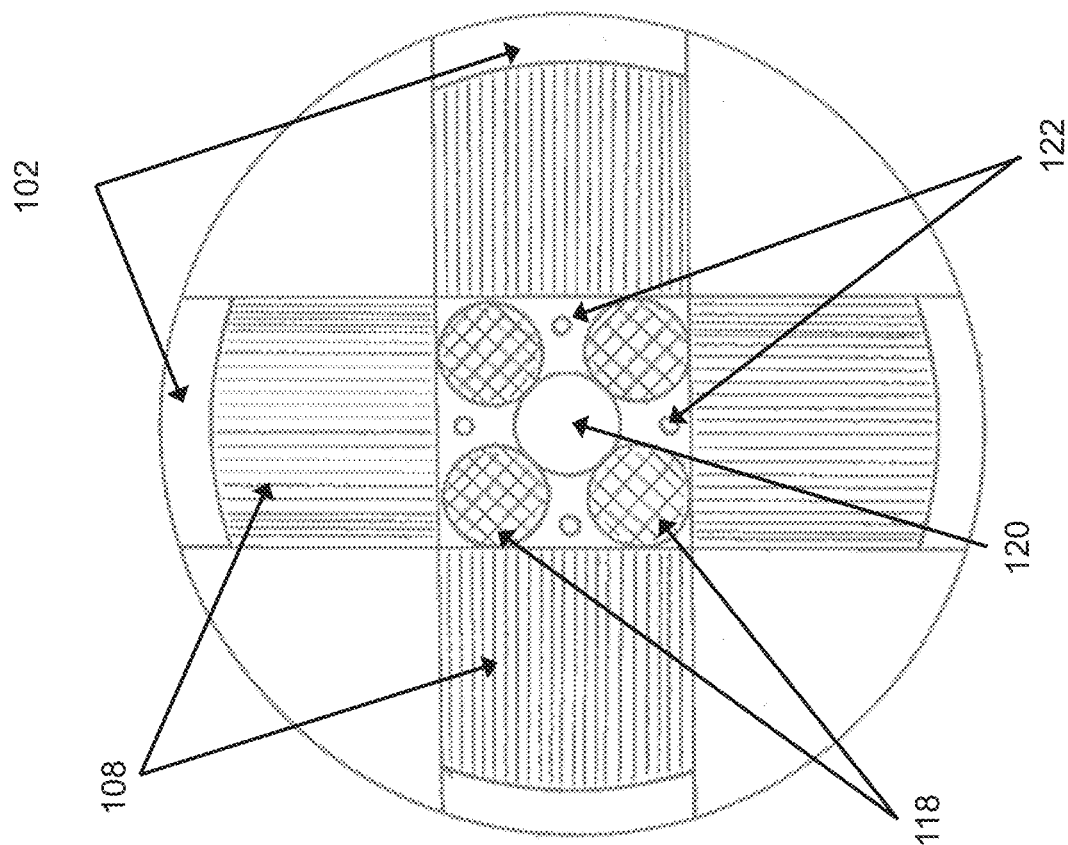

Embodiments in accordance with the invention are further described herein with reference to the drawings.

DETAILED DESCRIPTION

For illustrative purposes, the principles of the present disclosure are described by referencing various exemplary embodiments. Although certain embodiments are specifically described herein, one of ordinary skill in the art will readily recognize that the same principles are applicable to, and can be employed in other systems and methods.

Before explaining the disclosed embodiments of the present disclosure in detail, it is to be understood that the disclosure is not limited in its application to the details of any particular embodiment shown. Additionally, the terminology used herein is for the purpose of description and not of limitation. Furthermore, although certain methods are described with reference to steps that are presented herein in a certain order, in many instances, these steps may be performed in different order as may be appreciated by one skilled in the art; the method embodiments described are therefore not limited to the particular arrangement of steps disclosed herein.

It is be noted that as used herein and in the appended claims, the singular forms "a" "an", and "the" include plural references unless the context clearly dictates otherwise. Furthermore, the terms "a" (or "an"), "one or more" and "at least one" can be used interchangeably herein. The terms "comprising", "including", "having" and "constructed from" can also be used interchangeably.

Embodiment described herein describe an AUV that includes a spherical hull with quad-core, internal tunnel thrusters to reduce the likelihood of entanglement. The propulsion system is configured to minimize sediment disturbance. The AUV's four internal thrusters draw water from beneath the sphere and vector the wash upwards and outwards, symmetrically, from the center. This reduces downwash directed toward settled sediment on the seafloor or interior floor in the same way divers, while executing proper technique, bend their legs and use tight circular kicks. The resultant force vectors, aligned axially with the outlet tubes, converge at the geometric center of the vehicle. This enables a stable hover if the vehicle is positively buoyant. To propagate, the thrust is increased in two adjacent outlet tubes, resulting in a corresponding increase in the combined lateral component of thrust. Adjustments should be made to the vehicle's mass distribution to align the center-of-gravity with the central, vertical axis at or below the geometric center.

The AUV's software can be coded with a flight algorithm that is similar to those used for aerial quad-copter control, except in reverse. Four batteries sit adjacent to each thruster core. The example AUV's design is driven by the need to (1) minimize entanglement, (2) reduce the disruption of settled sediment, and (3) conserve battery power require reducing maneuvers to the minimum necessary for complete compartment exploration. This also drives the design of the hull to incorporate maximum sensor coverage to reduce, if not eliminate, the need to rotate the AUV in order to achieve such sensor coverage. The spherical hull incorporates a series of plates arranged as a truncated cuboctahedron, mapped onto a sphere, (similar to a soccer ball pattern) but modified to allow the positioning of the four thruster inlets, four thruster outlets, four ballast chambers, and a central payload outlet as described below with respect to FIGS. 4A-4F.

FIGS. 1A and 1B show an example sensor configuration for an AUV 100. The sensors are mounted flush with the AUV's 100 outer shell within movable sleeves in order to preserve the smoothness of the exterior surface. In this example, the sensor array includes two high-definition (HD) cameras 112 for visual environmental recording with corresponding LEDs 114 for illumination, and two LIDAR scanning sensors 104. The LEDs 114 should be oriented such that the beams do not intersect near the camera 112 lens in order to prevent unwanted illumination, known as "bloom-out," of particulate matter close to the lens. Tunnel thruster outlets 106 are positioned to accommodate the internal quad-core propulsion system.

Figure 1C:
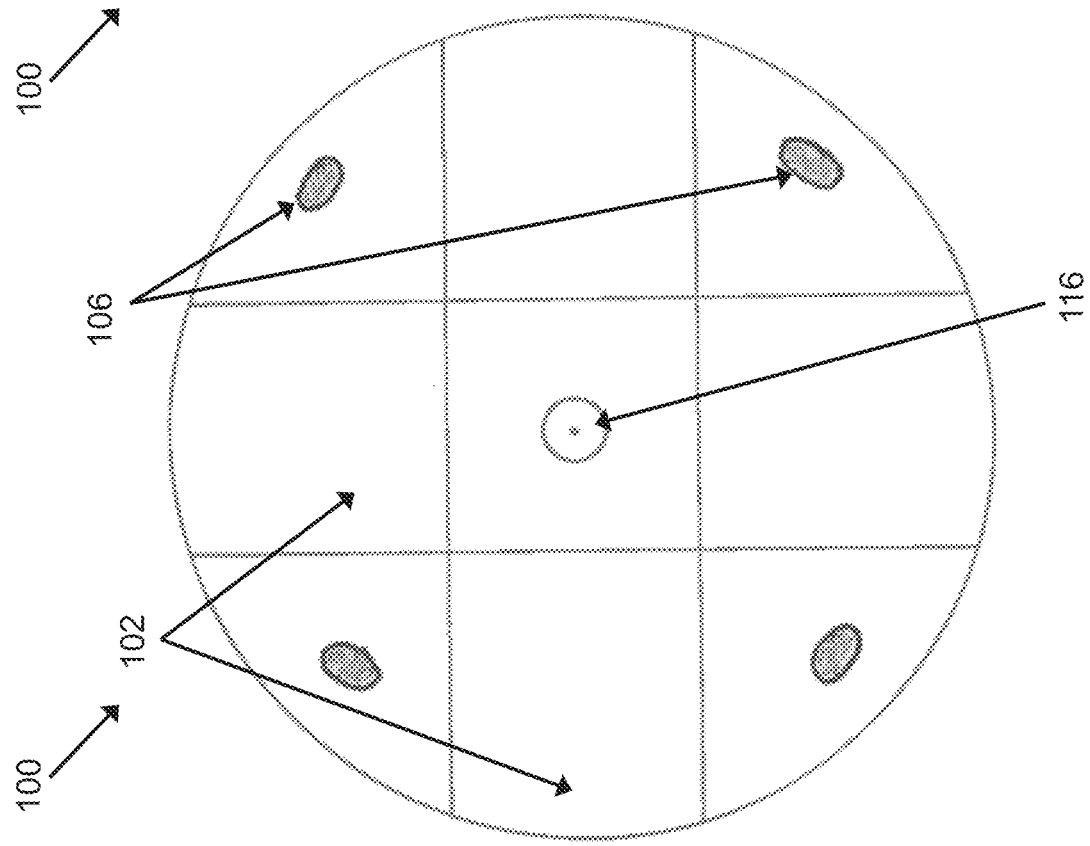

Three sleeves, two longitudinal arcs (polar sleeves) 102 and one equatorial circle (equatorial sleeve) 110, enable the four sensor sectors to rotate. The polar sleeves 102 rotate about the geometric center in the vertical plane while the equatorial sleeve 110 rotates up to 180 degrees about the geometric center in the horizontal plane along the sleeve tracks 108. A top view of the sleeve configuration is shown in FIG. 1C, and a bottom view of the sleeve configuration is shown in FIG. 1D.

Figures 1E, 1F:
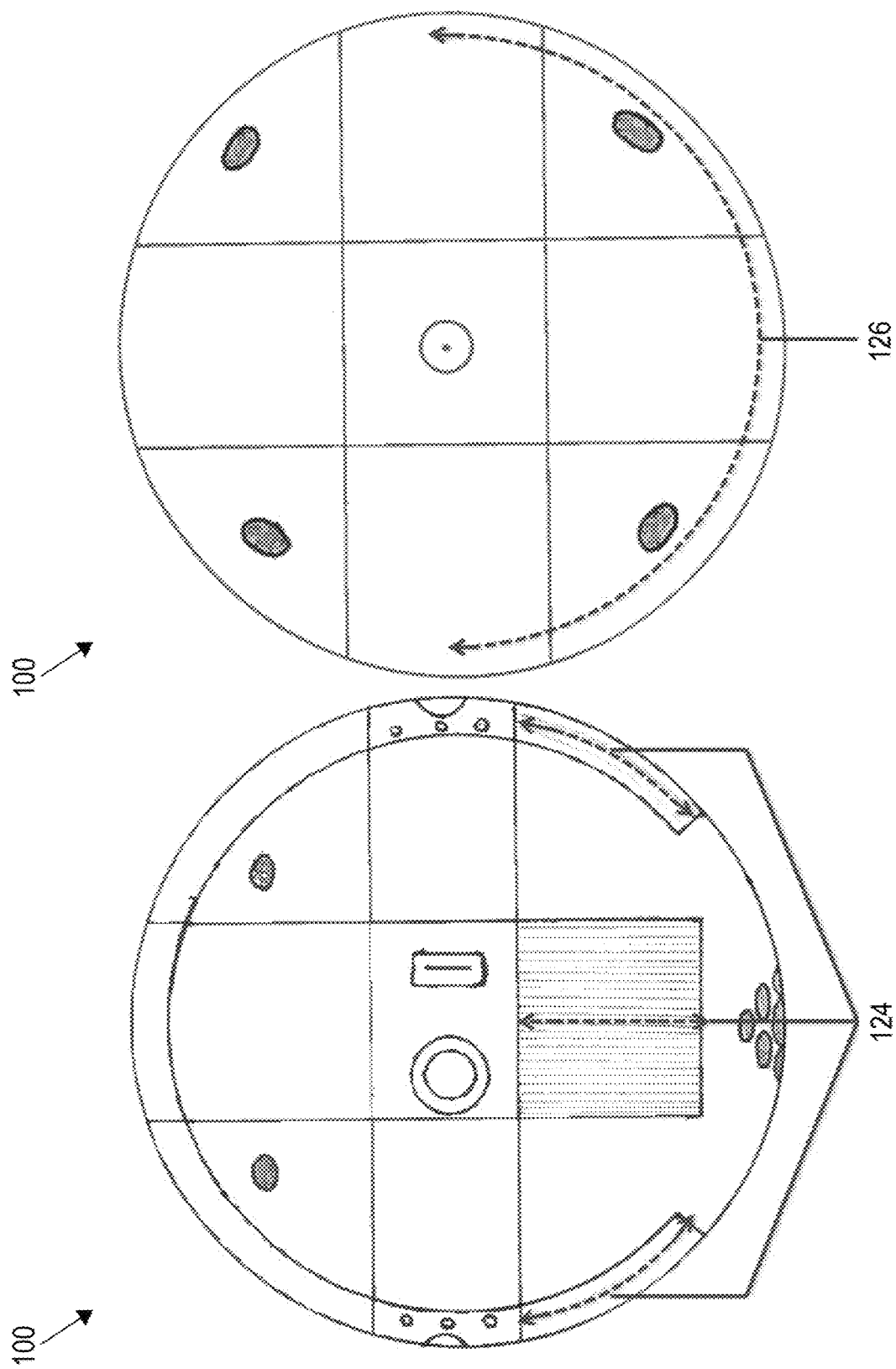

The sensor sleeves 102, 110 rotate on tracks 108 via small electric motors (not shown) in order to position the sensors during the scanning process. As shown in FIGS. 1E and 1F, the sleeve's freedom of movement (FOM) 124, 126 is limited to prevent interfering with the tunnel thruster and buoyancy compensator tubes and ports 106 at the bottom of the vehicle. The sensor sleeves 102, 110 lock and unlock the plates in which the sensors are mounted as necessary to allow the plates to be handed off from the equatorial sleeve 110 to a polar sleeve 102, or vice versa, as necessary. Due to the relatively large field of view of the sensors (50 degrees for a typical LIDAR), a nearly complete scan of the environment can be achieved. The uncovered regions, two cones oriented along the vertical axis on the top and bottom of the vehicle 100, will be covered as the vehicle 100 translates in any horizontal direction from the hovering position. A principal benefit of the use of rotating sleeves 102, 110 is the elimination of a great deal of maneuvering necessary for sensor coverage, and consequently, less disruption of silt.

In other embodiments, the sensor sleeves 102, 110 can be immobile. In these embodiments, extra sensors may be required to achieve sufficient sensor coverage around the vehicle 100. For example, an immobile hull is described below with respect to FIGS. 4A-4F.

FIGS. 1G and 1H show the internal components of the vehicle 100. Internally, the vehicle's 100 modular components are positioned symmetrically in order to ensure a distribution of weight that maintains a center of gravity slightly lower than the geometric center, with equal off-axis weight distribution.

An equipment shelf 136, located below the geometric center, remains fixed to the vertical tubes that house the thrusters 142, buoyancy compensator pistons 134, and beacons 128 dispensed by a beacon tube spring 130. The equipment shelf 136 is an attachment point for battery storage 146, computer space 138 and the motors 148, which drive the buoyancy compensator (BC) pistons 134. Note the clearance from the shelf 136 to the sensor arrays including an HD camera 144 necessary to allow for the sleeve's FOM. The functions of the thrusters 142, buoyancy compensators 140 and beacon cylinder 128 shown in FIGS. 1G and 1H are further discussed below.

FIGS. 2A and 2B show water flow through tunnel thrusters of an example AUV 200. The AUV 200 uses four angled tunnel thrusters 202 to provide propulsion. The tunnel thrusters 202 are located symmetrically about a central payload tube 208 that contains the deployable network beacons 210. An internal thruster configuration 202 minimizes the risk of fouling the propellers on debris. The upward oriented propeller wash 206 reduces silt-out conditions. Since sediment mostly collects on the floor of submerged structures, orienting the wash 206 upward avoids the wash impacting a majority of the silt. This technique is similar to a technical scuba diver's frog kick cycle.

When a diver executes a frog kick, the knees are bent and the fins rotated in small, opposing circles. The horizontal thrust component slowly propels the diver forward, while the corresponding fin wash is directed upward and aft of the diver, away from the floor sediments. AUV's 200 tunnel thrusters 202 draw water through the four lower inlets. The inlets are guarded with screens to prevent ingesting propeller-fouling debris such as string or wire and may be cleared of debris, if necessary, with a momentary reversal of thrust direction. The flow path 206 of water through the vehicle's internal structure is shown in FIGS. 2A and 2B.

Note the four tunnel thrusters 202 and the buoyancy chambers 204. In a stationary hover, the four thrusters 202 produce equal thrust, as necessary to offset the vehicle's 200 buoyancy, while producing no net horizontal thrust. The vehicle's 200 buoyancy is controllable by changing the volume of four airtight pistons located within the buoyancy chambers 204. To increase the buoyancy of a chamber 204, the compressed air cylinder piston expands downward, displacing the water out of the tunnel and replacing it with the expanding air. The corresponding volume increase generates the buoyant force. Likewise, the piston retracts and compresses the air to decrease the buoyancy. The pistons may act collectively or individually to compensate for thrust as necessary. The center of gravity is located below the geometric center, and the center of buoyancy is located above the geometric center to maintain a self-righting attitude.

Figure 3B:
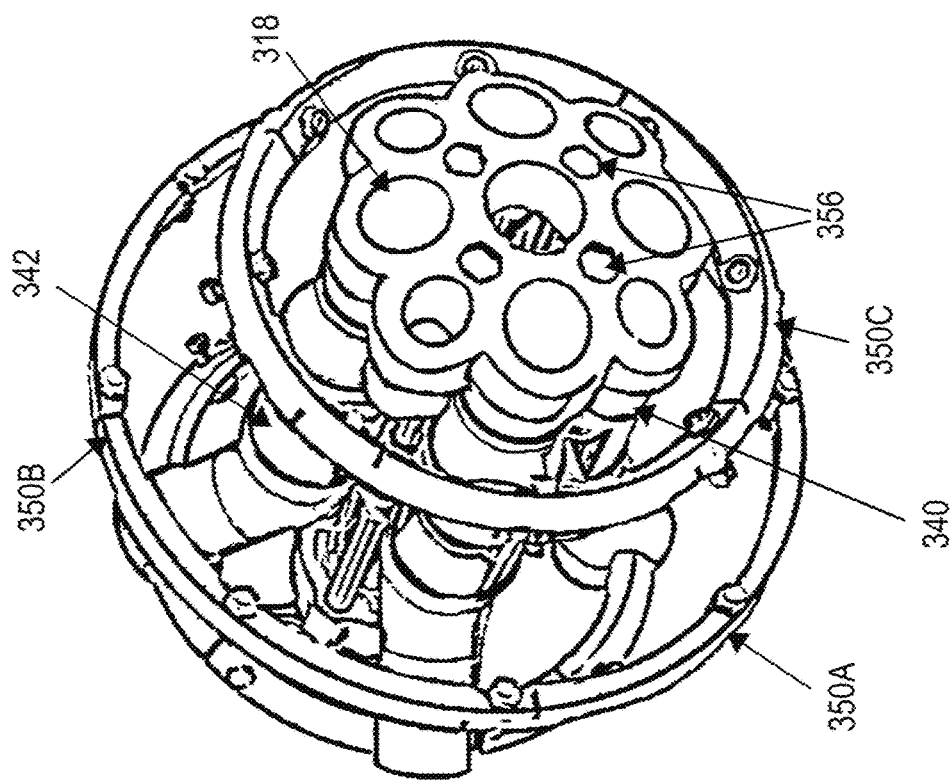
FIGS. 3A-3C show the internals of an example AUV.
Figure 3A:
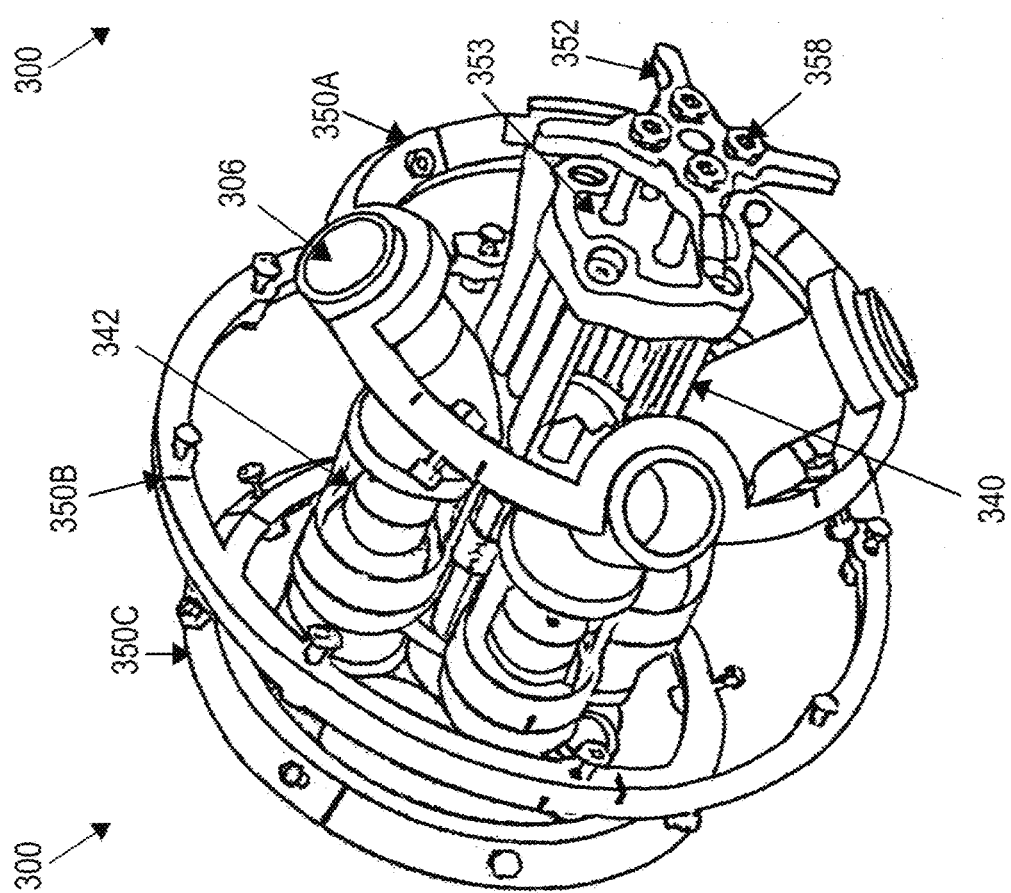
Figure 3C:
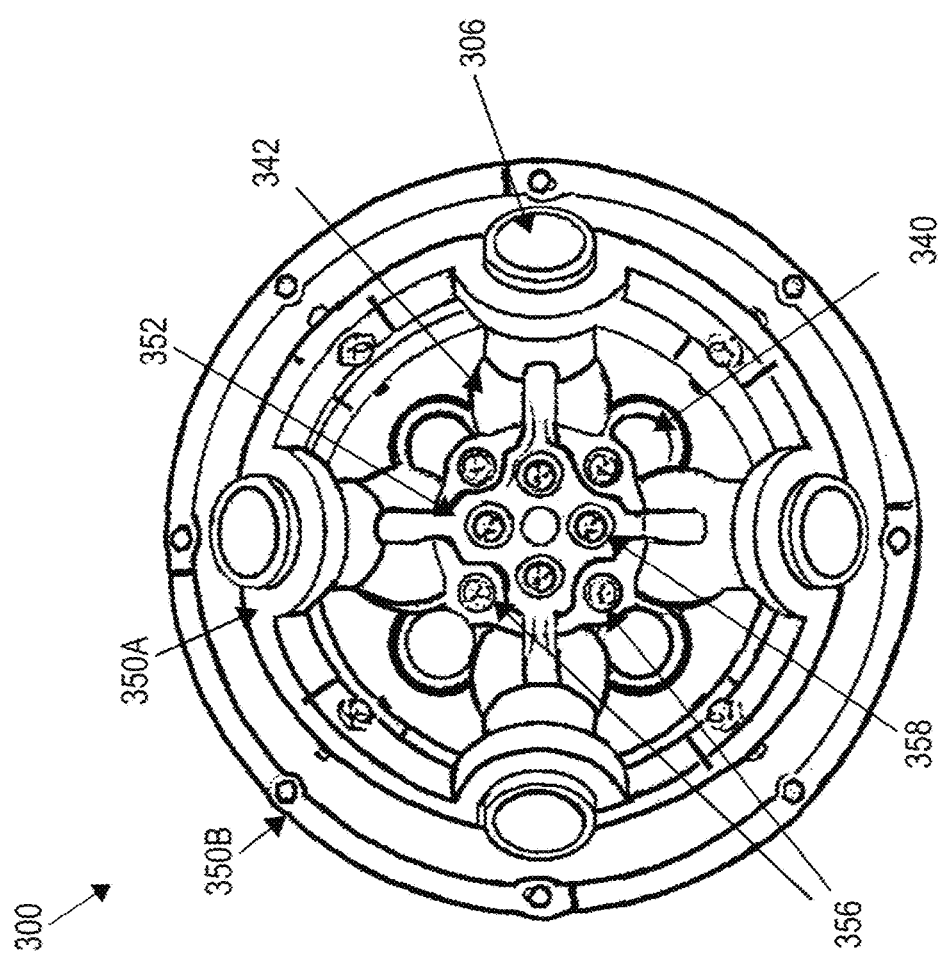

FIGS. 3A-3C show the internals of an example AUV 300. FIGS. 3A and 3B show top and bottom perspective views, respectively, of the example AUV 300, and FIG. 3C shows a top view of the example AUV 300. The example AUV 300 has an internal tunnel thruster 342 design. FIG. 3A shows tunnel thruster outlets 306 of the internal thrusters 342, and FIG. 3B shows tunnel thruster inlets 318 of the internal thrusters 342. Adjacent to the internal thrusters 342 are ballast chambers 340 of the AUV 300.

A detachable mechanism 352 for carrying the vehicle is provided by the removable, four bolt 358 carry handle 352 that ties into the top cap 353 and transmits force into the four plate retention bolts 356. The AUV 300 includes retention rings 350A-C for mounting hull plates (not shown) as described below with respect to FIGS. 4A-4F. An internal space exists between the retention rings 350A-C and the tunnel thrusters 342, where the internal space can be configured with various devices (e.g., controller, cameras, light detection and ranging sensors, light emitting diodes, batteries, buoyancy foam, ballast, etc.).

In this example, the tunnel thrusters 342 can include four motors (e.g., BlueRobotics M100, BlueRobotics M200, etc.), controlled by a controller (e.g., Raspberry Pi computer), that are fit inside acrylic motor tubes. Propellers for the motors can be designed to fit the thruster tubes and 3D printed on, for example, Ultimaker printers using solid-infill, 0.1 mm layer height white PLA. The described propeller design also differs from standard in that it has a much slimmer nosecone and a more aggressive blade angle of attack. Additionally, the blades attach closer to the end of the nosecone.

The tubes of the tunnel thrusters 342 can be expanded via PLA ducting such that a constant cross-sectional fluid flow area is maintained around the motors. In this example, all connections and circuit boards controlling the motors are waterproofed with marine epoxy. To avoid printing more tube structure than necessary, commercial tubes can be modified to fit the tunnel thruster 342 design.

For example, standard commercial PVC pipe can be cut to length using a chop saw, then sanded, painted and varnished with polyurethane. It is beneficial to use easily procured consumer-off-the-shelf (COTS) tubing, wherever possible, in lieu of printing while fabricating the thruster 342 cores. In this example, the motor mounts can be printed on white PLA on the Ultimaker machines at 20% infill and 0.1 mm layer height. Four offset screw holes on the back correspond to the mounting screws for the motors. A small slot on the side of the mount allows the signal wires to protrude through the thruster tube wall. The thruster outlet tubes can be glued to the four upper thruster ducts with marine epoxy after carefully preparing the surfaces and clamping the pieces together.

To connect the COTS tubing with the printed shells, brackets are incorporated into the 3D printing model for increased structural support.

The motors can be connected to electric speed controllers (ESCs) by soldering silicon coated aluminum leads. Spade plug connections can be incorporated between the motors and ESCs to allow the motors to be easily disconnected and replaced. The PLA motor mounts and acrylic thruster tubes can be notched to allow these control wires to pass through while permitting the acrylic tube to sit flush with the PLA motor mount. The computer can be programmed to run the motors using a pulse-width modulation (PWM) control. The motors may be run at various speeds and in either rotational direction. The electrical components can be waterproofed in marine epoxy.

Figure 4A:
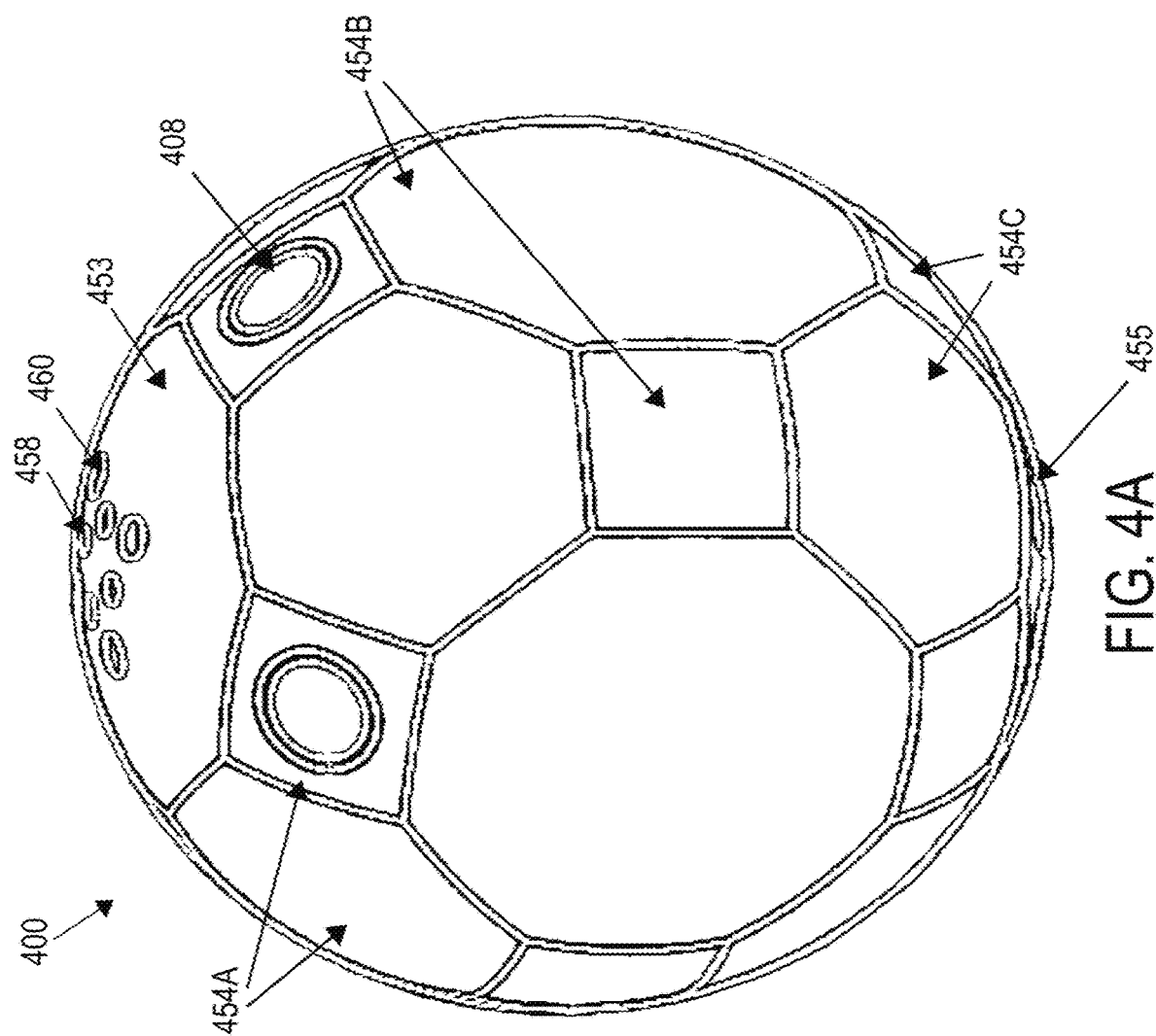
FIGS. 4A-4F shows a plated spherical hull for an example AUV.

FIG. 4A shows a plated spherical hull for an AUV 400. During operation, the carry handle (not shown in FIG. 4A) is removed, resulting in a smooth sphere. In this embodiment, the shown hull does not include integrated cameras in each plate 453, 454A-C, 455. In other embodiments, designs for the AUV 400 can incorporate integral (internal) support for docking cameras to each plate 453, 454A-C, 455, such that the lens sits flush with the hull exterior. In some cases, all parts are 3D printed and joined with stainless steel fasteners through fastener openings.

Figure 4C:
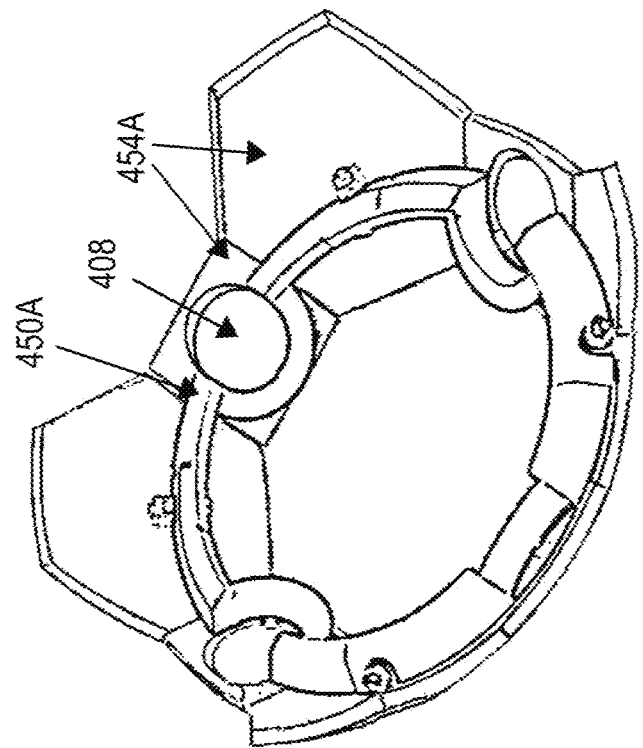
Figure 4B:
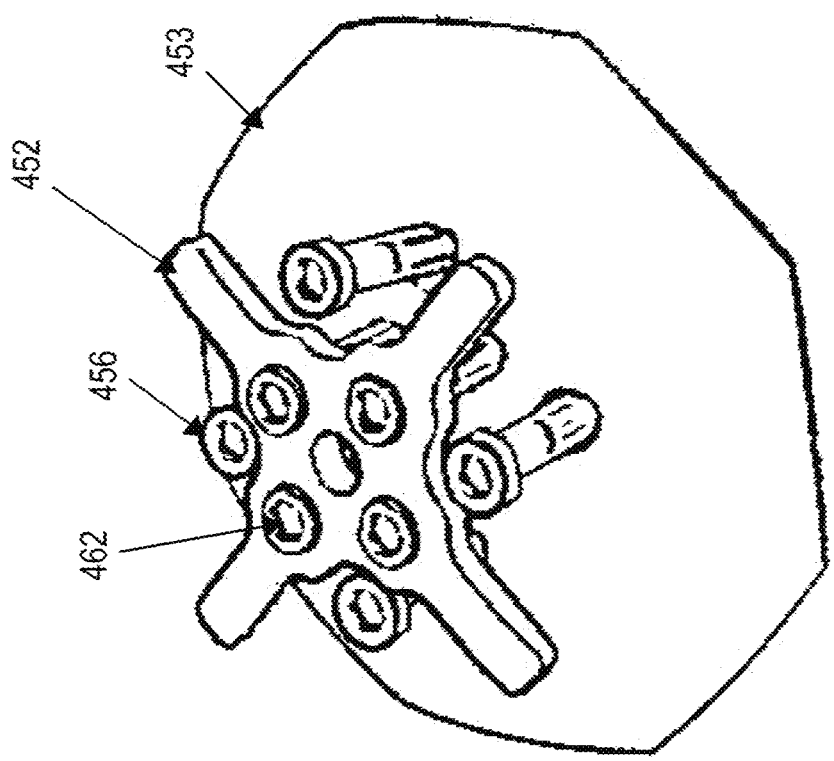
Figure 4D:
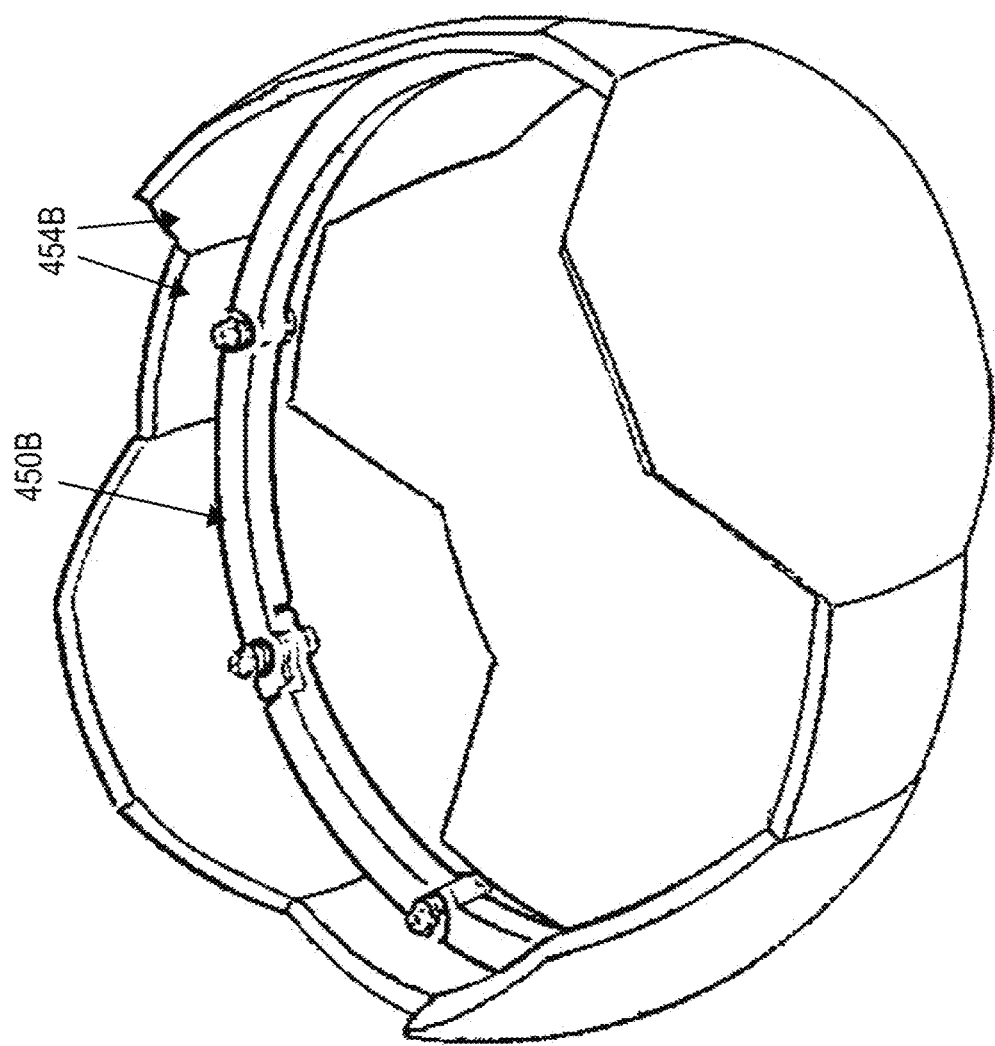
Figure 4F:
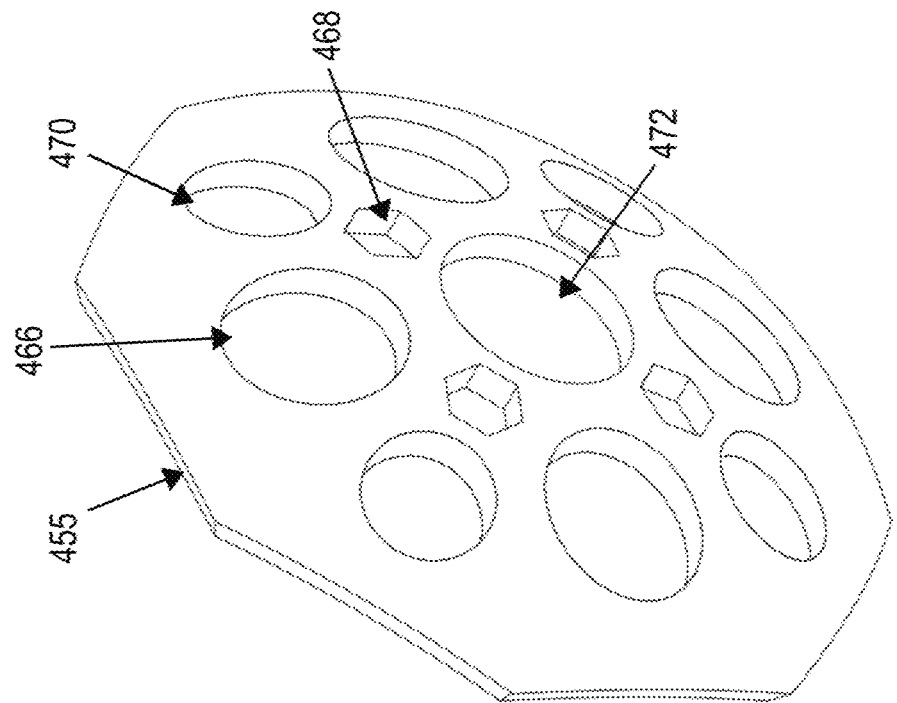

The hull plates 453, 454A-C, 455 include one large octagonal top plate 453 and bottom plate 455, with access 460, 468 to the four central plate retention bolts. The top plate 453 also allows for connection with the removable carry handle. The cross-shaped carry handle 452 can be configured to drop slightly to expose the recessed hex bolt heads 462 for easy removal. In FIG. 4F, the bottom plate 455 is shown as an octagon of equal dimensions as the top plate, but with four large holes 466 for the tunnel thruster intakes, four hexagon (to prevent lower retention bolt rotation during tightening or loosening of the upper retention bolts) access holes 468 for the plate retention bolts, and five ports (four small ballast ports 470 and one large central payload port 472). The three central plate rings 454A-C (an upper plate ring 454A, equatorial ring 454B, and lower plate ring 454C) consist of four small squares (with holes for the thruster outlets 408 on the top ring 454A) and four hexagons (for the upper 454A and lower rings 454C). The central ring 454B octagons are larger than the upper and lower ring hexagons. All five layers 453, 454A-C, 455 of the spherical hull are retained through the four plate retention rods, which also support the internal quad-core propulsion system (not shown).

The central plates 454A-C are joined by three segmented plate retention rings 450A-C as shown in FIGS. 4B-4E. The orientation of the retention rings 450A-C (without the plates attached) is shown in FIGS. 3A-3C. Each plate 454A-C is attached to a quadrant of the respective retention ring 450A-C by a single stainless steel bolt and nut. The lower plate 455 also incorporates integral cuffs for the tunnel thruster ducts. Each of the four tunnel thruster tubes are connected to the bolts via overlapping tabs that slide, in a layered fashion, over the rods from bottom to top.

Figure 4E:
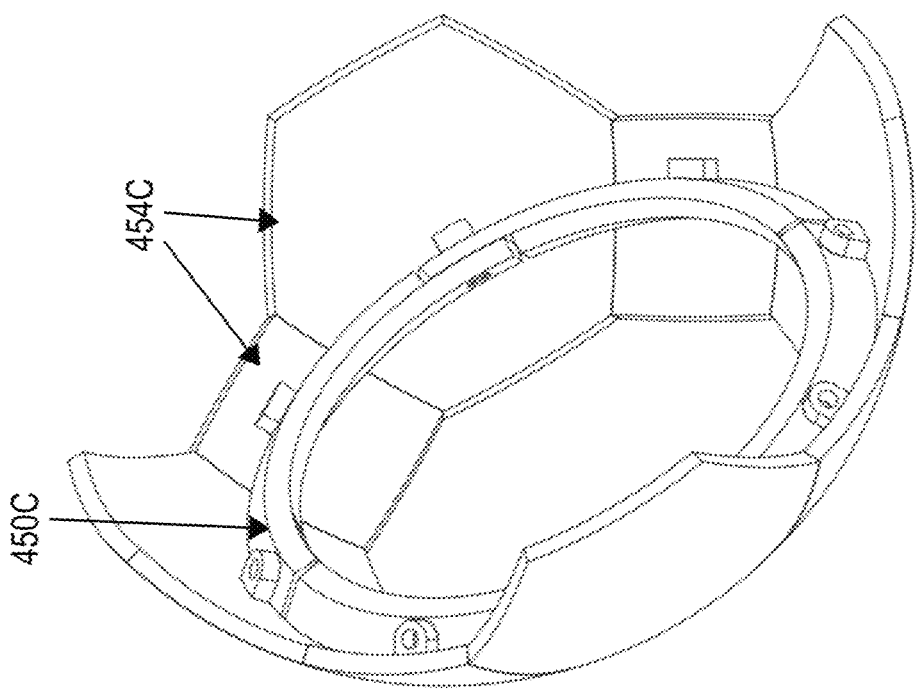

Three plate retention rings 450A-C hold the individual plates 454A-C together. Each plate 454A-C is connected to its retention ring 450A-C by a ¼ inch stainless steel bolt, joining a PLA bolt loop on the inner surface of each plate 454A-C, with corresponding holes in the plate ring 450A-C. This connection pattern is depicted in FIGS. 4C, 4D, and 4E.

To increase the strength of the propulsion core, four retention bolts that pass through offset and interlocking loops on all eight printed thruster tube ducts are used. This modification connects and supports the propulsion core as described above with respect to FIGS. 3A-3C.

In this example, the bolts insert from the bottom of the vehicle 400, upwards, through the lower plate 455. The bolt hex heads countersink in the lower plate 455 to retain a flush outer surface and prevent them from rotating during tightening. The rods extend up through the loops of the ducts connecting each of the four lower and four upper thrust tube ducts before joining with the coupling nuts. Each layer of components in the quad core stacks above the next, guided by the four retention rods. The first layer 454C above the bottom plate 455 consists of four PVC thruster inlets and four smaller ballast tubes. Next, the lower thruster tube ducts are positioned above the thruster outlets, and the thrusters, attached to their PLA motor mounts and inside the acrylic thruster tubes, are positioned above the lower ducts. Each motor mount has 3 fins supporting the motor mid-stream inside the cuff. The fins reduce the swirling effect of propeller wash at the outlet. The upper ducts are positioned over the thrusters, which are tightened down by the coupling nuts, securing the entire propulsion quad core to the bottom plate 455.

The top plate 453 has four holes 460 allowing shorter, stainless steel machine screws to pass through and join with the coupling nuts. These screws have circular, socket cap heads to permit rotation and tightening. The lower 454C, middle 454B and upper plate 454A retention rings 450C, 450B, and 450A, respectively are then sandwiched between the top 453 and bottom plates 455. In this example, the four bolts 456 retaining the upper plate 453 can be removed, and each layer subsequently lifted off, to access the internal components of the vehicle 400. To allow secure and easy handling of the vehicle 400, a removable carry handle 452 can be integrated with the top plate 453. The handle 452 is designed to attach to the top of the vehicle 400 while not putting undue stress on the top plate 453 PLA. To accomplish this, the lifting force of the handle 452 is transferred through the thruster core retention bolts; thus, sparing the plate retention rings 450A-C of the load. In this example, the resulting design incorporates a cross-shaped handle 452 printed in yellow PLA, through which four stainless steel bolts 462, of the same type used for the upper bolts 456 of the retention rods, pass through the top plate 453.

These bolts 462 connect to nuts imbedded into corresponding hex holes in a yellow PLA bracket (353 of FIG. 3A) of the handle 452 that fits flush with the inside of the top plate 453. The nuts can be glued into position with marine epoxy within these holes, and the bracket can fit snugly within the walls of the upper bracket integral with the top plate 453. The handle 452 bolts 462 are modified to allow the handle 452 to drop approximately an inch to allow the bolt socket cap heads to be hand-tightened into the top plate 453. To do this, fine zip ties can be attached to the bolts 462 and secured in place with marine epoxy, allowing the handle 452 to slide down and rest at this position, exposing the circular bolt heads. The bolt heads counter sink into corresponding circular holes in the cross handle when the handle 452 is lifted.

The plated sphere scheme has several advantages. First, it enables faster printing since multiple printers can be simultaneously employed. Less expensive printers may be used, as the required print tray area is decreased. This may be especially advantageous for fabrication of parts in confined areas, such as shipboard environments. Risk of time and expense for failed prints or operational damage to the hull is also reduced. Finally, the modular nature of the plate configuration makes the design ideal for mounting and accessing sensors. With a sufficient number of cameras installed, nearly complete (4n steradian) visual coverage can be achieved; thus, satisfying the requirement to minimize rotational movements. In this example, a central, vertical payload tube may house deployable beacons for navigation. Ample space is available elsewhere within the hull for additional ballast, buoyancy foam, or mission-specific hardware.

Multiple plates 453, 454A-C, 455 and retention ring segments 450A-C can be printed flat (oriented such that the outer surface of the sphere is on top) with support unless the retention ring segments are printed integral with the plate. The resulting plates 453, 454A-C. 455 are higher quality than the corresponding sections of a complete hemisphere print, especially those areas near the middle, since the orientation of the sidewall layers is horizontal and no cracks can form completely through the sidewalls as is possible with the hemisphere prints. In one example, the hull consists of twenty-six plates 453, 454A-C, 455 printed in black polylactic acid (PLA) plastic filament, including eight small hexagons, 12 small squares, and six large octagons (including the upper 453 and lower plates 455), as shown in FIG. 4A.

At sufficient depth, implosion of the plates 453, 454A-C, 455 can be expected when printed with infill. Some minor misalignment of the hull plates 453, 454A-C, 455 may be relieved by using solid prints with materials less subject to warping, such as poly carbonate, carbon fiber or metal. Additionally, individual plates 454A-C may be lightly glued to the plate retention rings 450A-C with marine resin, in addition to the stainless steel fasteners, to aid alignment and achieve a smooth exterior while preserving relative ease in plate removal if necessary.

Four hexagons and four squares make up the lower 454C and upper plate rings 454A. The upper plate ring 454A squares incorporate holes 408 for thruster outlets. The equatorial ring 454B consists of four large octagons and four squares. Each plate retention ring 450A-C is divided into four sections and printed in, for example, yellow PLA. In this example, all middle plates 454A-C, with the exception of the four square plates on the upper ring 454A (which are glued in place), are attached to the retention rings 450A-C with ¼ inch stainless steel bolts.

As shown in FIG. 4F, the bottom plate 455 includes four thruster tube inlets 466, a central payload tube port 472, and four smaller ballast ports 470.

In some embodiments of the invention, the vehicle 400 is capable of autonomous navigation. For example, beacon-aided navigation in combination with video data collection can be used for real-time obstacle avoidance and post-mission data processing. RF-enabled beacons, in the form of compact, flat, circular disks, with threaded edges, may be stacked inside a threaded sleeve within the central payload tube. The central payload tube will thus become a mechanism for beacon deployment. In this case, two thin rods can extend from the top plate through each disk in the stack, holding the stack stationary as the tube is rotated by an adjacent beacon actuator. This beacon actuator can interface with the outside of the tube at the top of the sphere and rotate the tube as necessary to deploy the beacons. In this manner, the lowest beacon can be unscrewed from the bottom of the tube and deploy. Additional beacons may then be deployed, according to prescribed navigational logic, to lay a "bread crumb trail" to enable the vehicle 400 to return from within an enclosed space.

In other embodiments, on-board, real-time 3D processing of video or underwater LIDAR sensor data could eliminate the need for external navigation aids. A compact, blue-green wavelength underwater LIDAR suitable for close-quarters processing of submerged, enclosed spaces would greatly augment 3D simultaneous localization and mapping (SLAM) capability. Compact atmospheric LIDAR for robotics are prevalent, and such a system may be converted into a blue-green wavelength sensor. Alternatively, an existing underwater LIDAR could be modified to fit within the available space of the vehicle 400.

The previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. An autonomous underwater vehicle (AUV) comprising:
   a frame;
   tunnel thrusters for propelling and orientating the AUV, the tunnel thrusters:
      having inlets and outlets, wherein each of the outlets is directed in a different orientation, and
      mounted to the frame; and fasteners for connecting the frame to a hull, the fasteners having an orientation that is substantially parallel to the tunnel thrusters; and the hull having a spherical shape, the hull further comprising:
- a bottom plate having inlet openings for the inlets of the tunnel thrusters,
- a top plate having outlet openings for the outlets of the tunnel thrusters, wherein the top plate and the bottom plate are affixed to the fasteners and hold plate rings of the hull in place, and wherein the bottom plate, the top plate, the plate rings are a plastic material that is suitable for three-dimensional (3D) printing, and
- each of the plate rings further comprising:
  - a corresponding retention ring, wherein each of the corresponding retention rings is 3D printed as four retention ring sections; and
  - corresponding central plates that are attached to the corresponding retention ring,
- wherein the top plate, the central plates, and the bottom plate form a substantially continuous surface of the hull.

2. The autonomous underwater vehicle of claim 1, wherein each of the corresponding central plates is affixed to the corresponding plate retention ring by a bolt.

3. The autonomous underwater vehicle of claim 1, wherein at least one of the corresponding central plates has an outlet opening for an outlets of the tunnel thrusters.

4. The autonomous underwater vehicle of claim 1, wherein the bottom plate, the top plate, the plate rings are coated with a polyurethane varnish.

5. The autonomous underwater vehicle of claim 1, wherein the bottom plate has ports for housing buoyancy compensation devices or ballast devices.

6. The autonomous underwater vehicle of claim 1, a detachable handle that is removably attached to the frame.

7. The autonomous underwater vehicle of claim 6, wherein the top plate has handle bolt openings, and wherein the detachable handle can be attached to the frame by handle bolts through the handle bolt openings.

8. The autonomous underwater vehicle of claim 1, wherein the top plate and the bottom plate have frame bolt openings, and wherein the top plate and the bottom plate are attached to the frame by countersunk frame bolts through the frame bolt openings.

9. The autonomous underwater vehicle of claim 1, further comprising:
- an autonomous navigation system to autonomously navigate the autonomous underwater vehicle; and
- at least one camera to provide a visual stream of a surrounding environment for the autonomous navigation system.

10. The autonomous underwater vehicle of claim 9, further comprising at least one compact, underwater LIDAR sensor to provide depth data for the autonomous navigation system.

\* \* \* \* \*